(12) United States Patent
Chauvel et al.

(10) Patent No.: US 6,678,797 B2
(45) Date of Patent: Jan. 13, 2004

(54) CACHE/SMARTCACHE WITH INTERRUPTIBLE BLOCK PREFETCH

(75) Inventors: Gerard Chauvel, Antibes (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 09/932,317

(22) Filed: Aug. 17, 2001

(65) Prior Publication Data

US 2002/0065990 A1 May 30, 2002

(30) Foreign Application Priority Data

Aug. 21, 2000 (EP) .............................. 00402331
Mar. 22, 2001 (EP) .............................. 01400685

(51) Int. Cl.[7] .............................................. G06F 12/08
(52) U.S. Cl. ....................................................... 711/137
(58) Field of Search ................................. 711/129, 133, 711/134, 135, 137

(56) References Cited

U.S. PATENT DOCUMENTS 5,511,178 A * 4/1996 Takeda et al. ............... 711/125
2002/0108019 A1 * 8/2002 Allen et al. .................. 711/118

FOREIGN PATENT DOCUMENTS

EP       0 529 217 A    3/1993
WO    WO 89 09444 A   10/1989

OTHER PUBLICATIONS

Texas Instruments Incorporated, S/N: 09/591,537, filed Jun. 9, 2000, *Smart Cache*.

Texas Instruments Incroporated, S/N: 09/187,118, filed Nov. 5, 1998, *Computer Circuits, Systems, and Methods Using Partial Cache Cleaning*.

Texas Instruments Incorporated, S/N: 09/447,194, filed Nov. 22, 1999, *Optimized Hardware Cleaning Function for VIVT Data Cache*.

Texas Instruments Incorporated, S/N: 09/591,656, filed Jun. 9, 2000, *Cache With Multiple Fill Modes*.

IBM Technical Disclosure Bulletin, *Prefetching With Invalid Cache Entries*, vol. 33, No. 3B, Aug. 1, 1990, p. 46; IBM Corp., New York, NY, US.

Tehranian, Michal M.: *DMA Cache speeds Execution in Mixed–Bus Systems*, Computer Design, vol. 24, No. 8, Jul. 15, 1985 (pp. 85–88).

* cited by examiner

*Primary Examiner*—Kevin Verbrugge
(74) *Attorney, Agent, or Firm*—Robert D. Marshall, Jr.; W. James Brady, III; Frederick J. Telecky, Jr.

(57) ABSTRACT

A digital system and method of operation is provided in which the digital system has at least one processor, with an associated multi-segment memory circuit. Validity circuitry is connected to the memory circuit and is operable to indicate if each segment of the plurality of segments holds valid data. Block transfer circuitry is connected to the memory circuit and is operable to transfer a block of data to a selected portion of segments of the memory circuit such that a transfer to any segment within the selected portion of segments holding valid data is inhibited. A block transfer to a selected plurality of segments in the memory circuit is initiated (1600, 1624). During the block transfer, each segment is tested (1602) to detect if a segment within the selected plurality of segments holds valid data. A transfer within the block transfer to a segment is inhibited if the segment contains a valid data value (1604). Valid data can be transferred to a segment by a single data or instruction operation after a block transfer is initiated (1626). In this case, a transfer within the block transfer to the segment is inhibited if the segment contains a valid data value (1602).

10 Claims, 15 Drawing Sheets

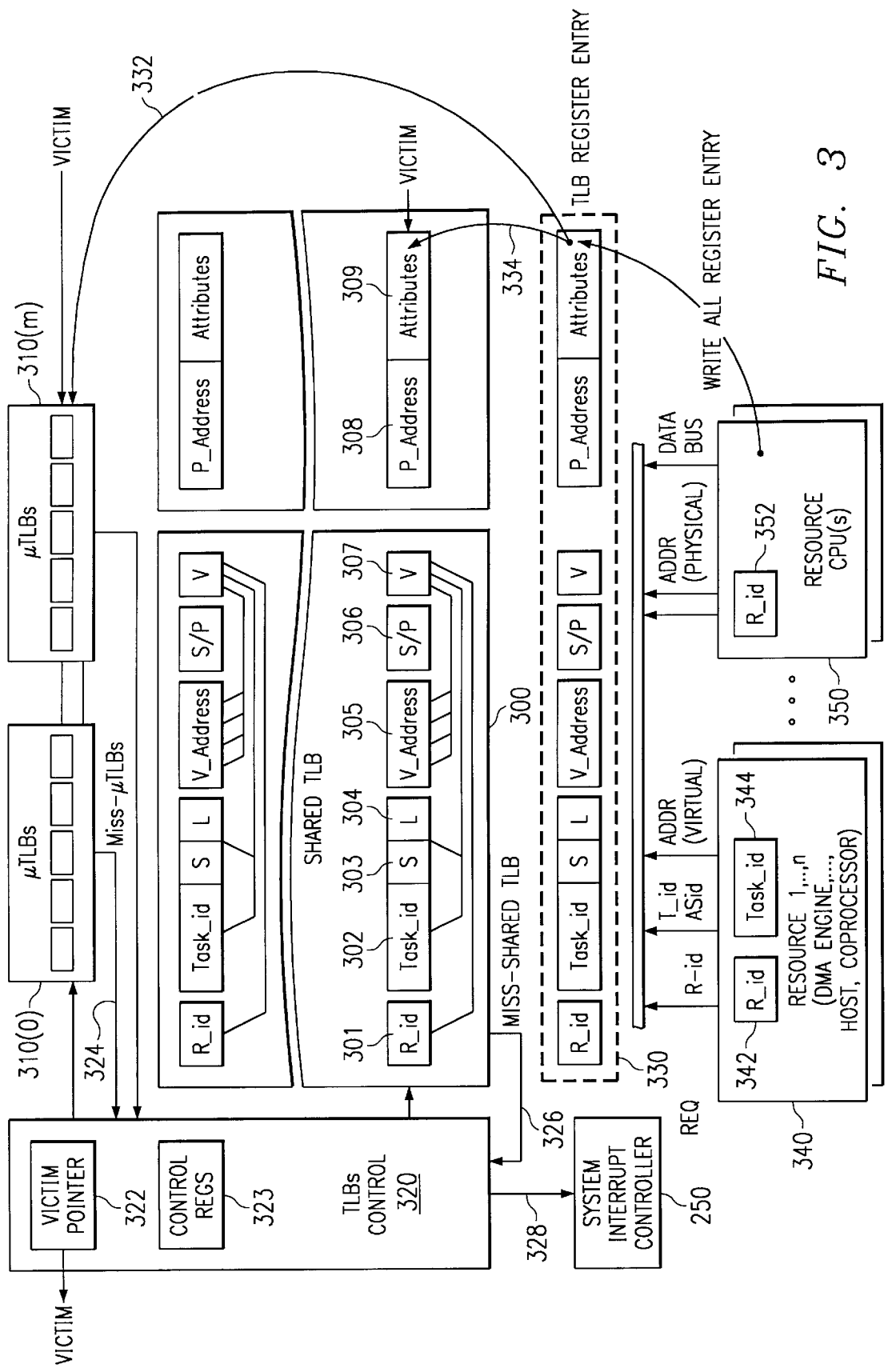

US 6,678,797 B2

CACHE/SMARTCACHE WITH INTERRUPTIBLE BLOCK PREFETCH

This application claims priority to European Application Serial No. 00402331.3, filed Aug. 21, 2000 and to European Application Serial No. 01400685.2, filed Mar. 15, 2001. U.S. patent application Ser. No. 09/932,651 is incorporated herein by reference.

FIELD OF THE INVENTION

This invention generally relates to microprocessors, and more specifically to improvements in cache memory and access circuits, systems, and methods of making.

BACKGROUND

Microprocessors are general purpose processors which provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

SUMMARY OF THE INVENTION

Particular and preferred aspects of the invention are set out in the accompanying independent and dependent claims. In accordance with a first aspect of the invention, there is provided a digital system having at least one processor, with an associated multi-segment memory circuit. Validity circuitry is connected to the memory circuit and is operable to indicate if each segment of the plurality of segments holds a valid data value. Block transfer circuitry is connected to the memory circuit and is operable to transfer a block of data to a selected portion of segments of the memory circuit such that a transfer to any segment within the selected portion of segments holding valid data is inhibited.

Another aspect of the present invention provides a method of operating a digital system having a processor and memory circuit. A block transfer to a selected plurality of segments in the memory circuit is initiated. During the block transfer, each segment is tested to detect if a segment within the selected plurality of segments holds valid data. A transfer within the block transfer to a segment is inhibited if the segment contains a valid data value.

Another aspect is that valid data can be transferred to a segment by a single data or instruction operation after a block transfer is initiated. In this case, a transfer within the block transfer to the segment is inhibited if the segment contains a valid data value.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIG. 3 is a block diagram illustrating a shared translation lookaside buffer (TLB) and several associated micro-TLBs ($\mu$TLB) included in the megacell of FIG. 2;

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
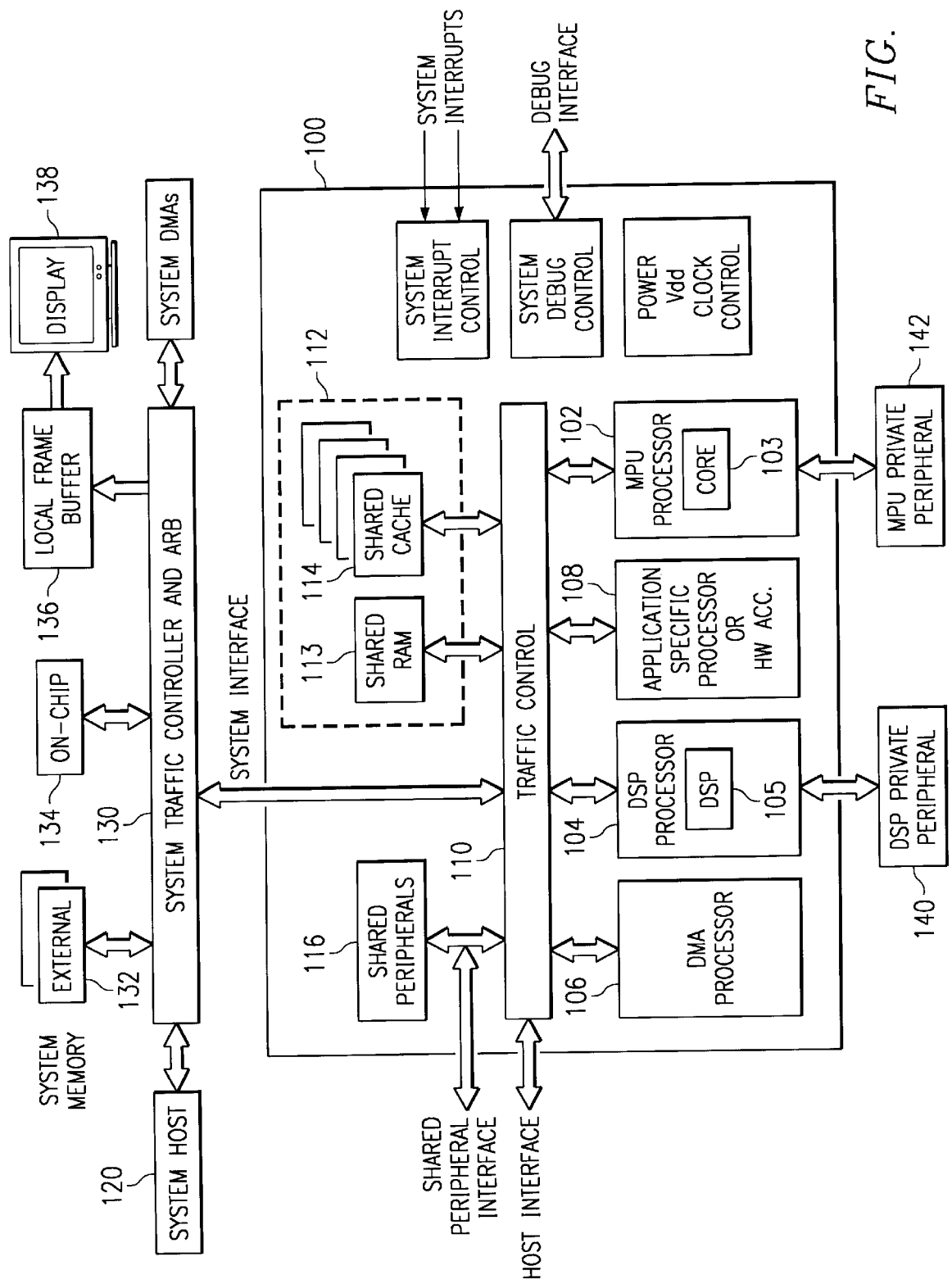
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a memory access node in a host processor 120, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. Host processor 120 interacts with the resources on the megacell via system traffic controller 130. A host interface connected to traffic controller 130 allows access by host 120 to megacell 100 internal and external memories. A set of private peripherals 140 are connected to the DSP, while another set of private peripherals 142 are connected to the MPU.

Figure 2A:
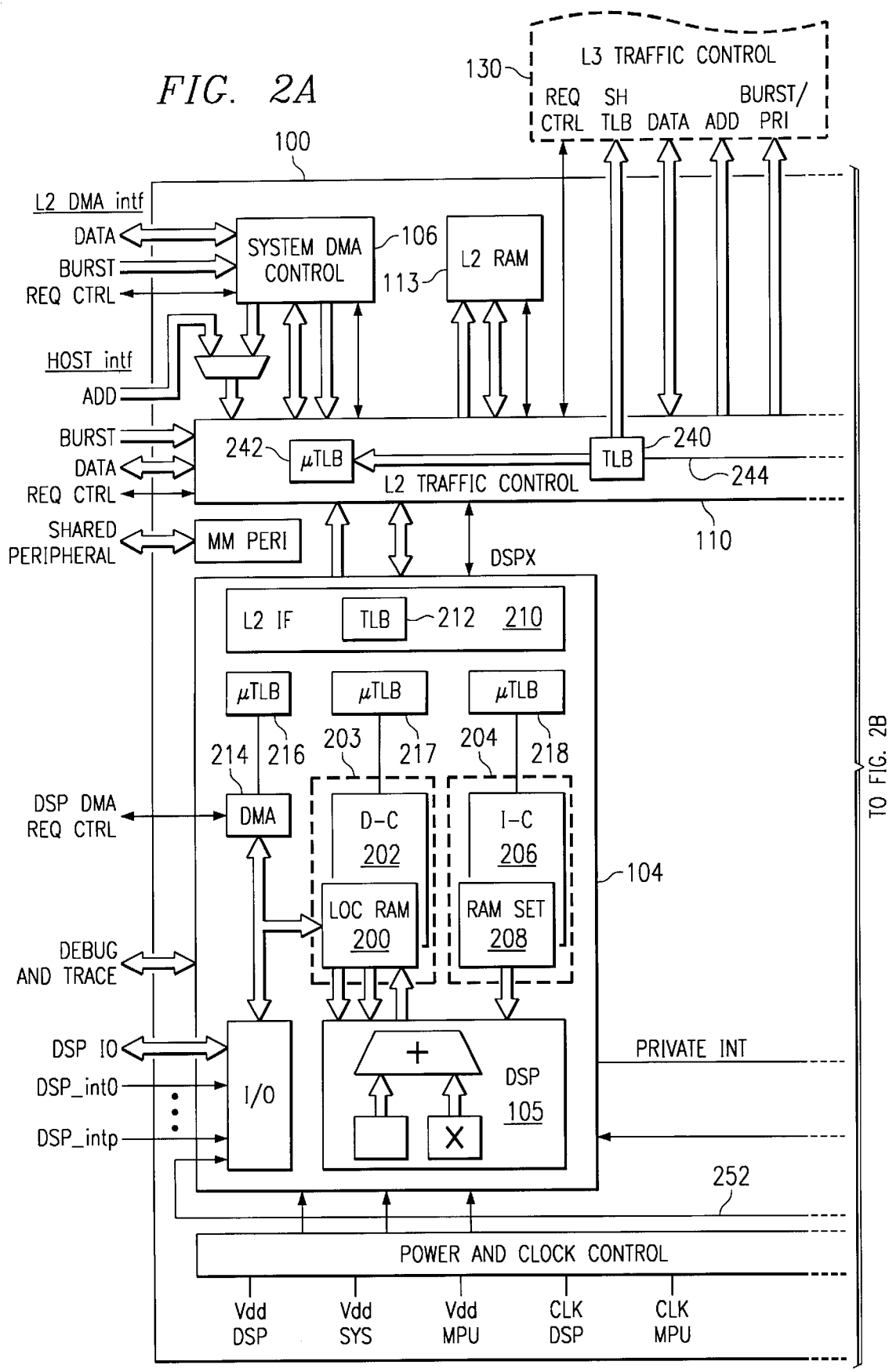
FIGS. 2A and 2B together is a more detailed block diagram of the megacell core of FIG. 1.
Figure 2B:
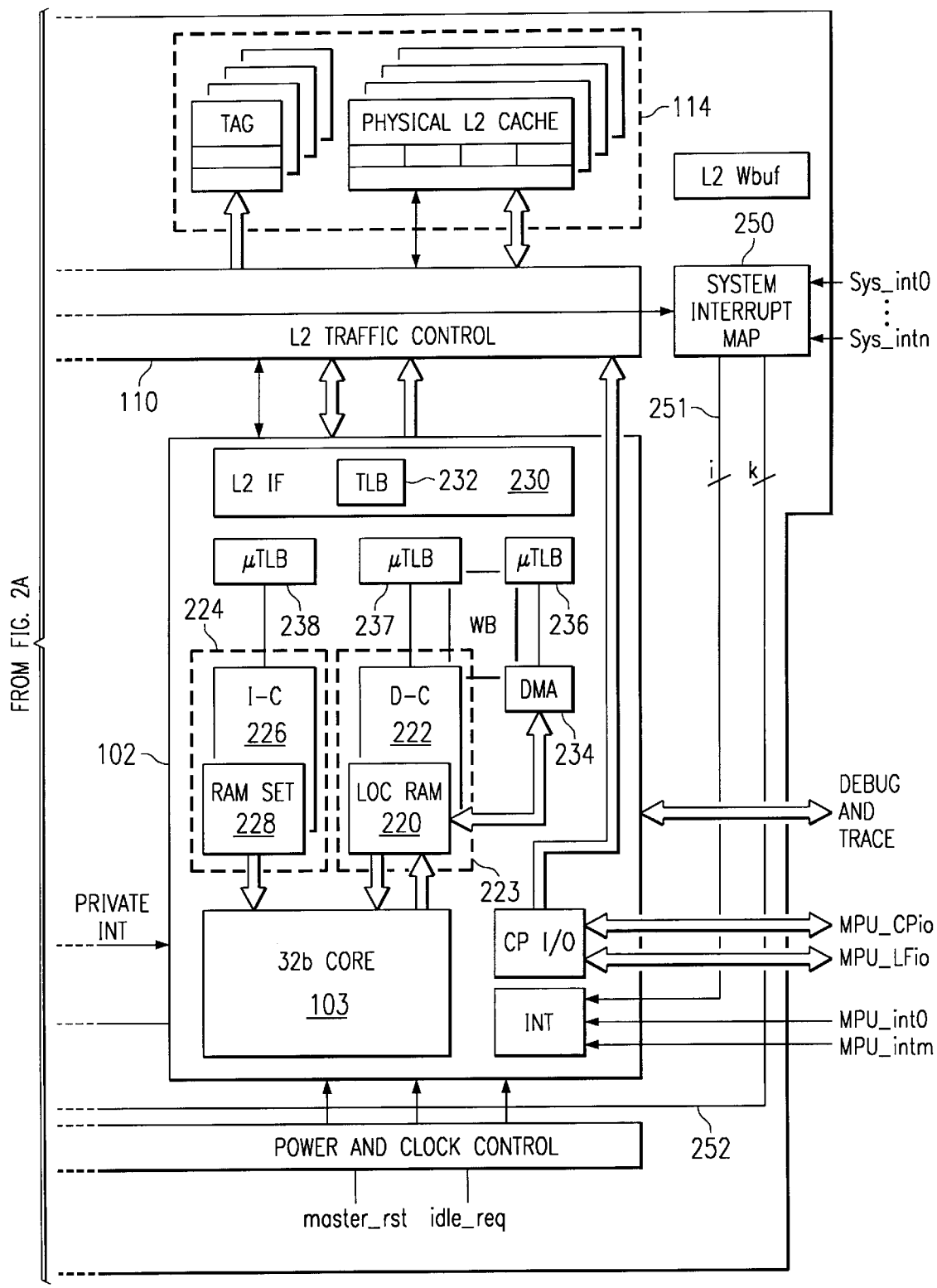

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively. L2 traffic controller 110 includes a TLB 240 and a micro-TLB (μTLB) 242 that is associated with system DMA block 106. Similarly, L3 traffic controller 130 includes a μTLB controllably connected to TLB 232 that is associated with system host 120. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The TLB caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to MPU 102.

Upon a TLB miss, i.e., the TLB does not contain an entry corresponding to the virtual address requested, translation table walk software retrieves the translation and access permission information from a translation table in physical memory. Once retrieved, the page or section descriptor is stored into the TLB at a selected victim location. Because a "load and store multiple" instruction may potentially cross a page boundary, the permission access is checked for each sequential address.

Unpredictable behavior will occur if two TLB entries correspond to overlapping areas of memory in the virtual space. This can occur if the TLB is not flushed after the memory is re-mapped with different-sized pages leaving an old mapping with different sizes in the TLB, and making a new mapping that gets loaded into a different TLB location, for example.

MMU/TLB Control Operation

FIG. 3 is a block diagram illustrating a shared translation look-aside buffer (TLB) 300 and several associated micro-TLBs (µLTLB) 310(0)-310(n) included in megacell 100 of FIG. 2. On a µTLB miss, the shared TLB is first searched. TLB controller 320 is alerted by asserting a µTLB miss signal 324. In case of a hit on the shared TLB, the µTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting µTLB at a selected victim location as indicated by arcs 332 and 334.

Shared Cache and RAM

Referring again to FIG. 1, Megacell 100 includes large shared memory subsystem 112 that function as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, entitled *Smart Cache*. Advantageously, RAM-set configured as a RAM offers fast memory scratchpad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

RAM-set control registers, such as control register 531 in cache control circuitry 530 (FIG. 4), are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

Figure 4:
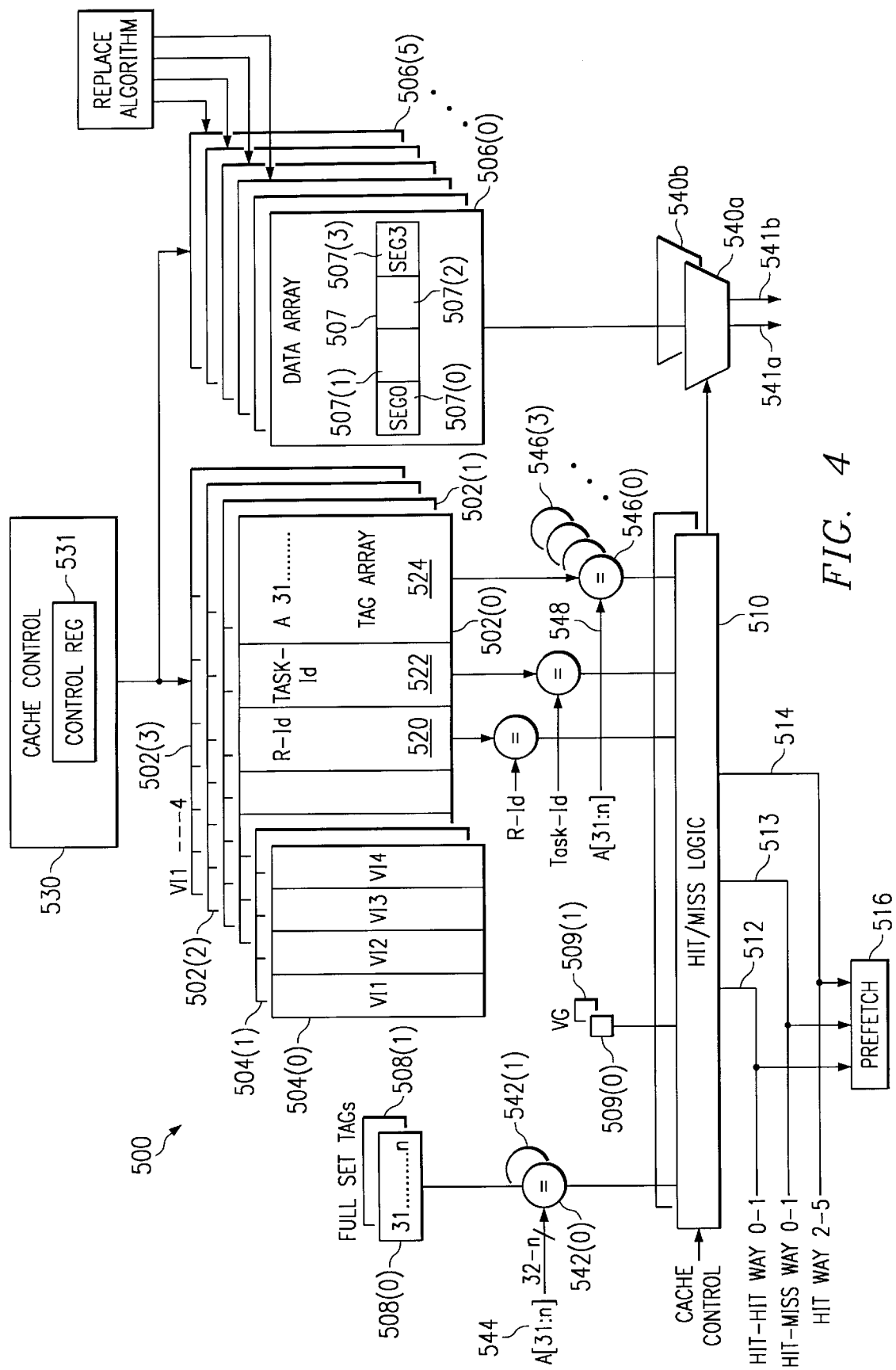
FIG. 4 is a block diagram illustrating a configurable cache that is included in the megacell of FIG. 1 that has a cache and a RAM-set.

FIG. 4 is a block diagram illustrating a representative configurable cache 500 that has a cache representative of L2 cache 114 and a RAM-set representative of shared RAM 113. Configurable cache 500 is also representative of L1 cache 203, 204, 223, and 224 that are included respectively in each of the processor modules 102, 104 of FIG. 2; however, in the present embodiment, each L1 cache has only a single segment per line. As discussed above, the configurable cache is composed of a 4-way set-associative cache that includes a TAG Array 502(0–3) and Data array 506 (2–5) and one or more additional RAM-sets, in this case data arrays 506(0–1). In the present embodiment, data array 506(1–5) are each 32 kbytes, while data array 506(0) is 64 kbytes.

During an access request, each TAG array 502(0–3) provides a tag value to a respective comparator 546(0–3) and is compared against a most significant portion of a proffered address 548. A tag value is stored in tag array 502(0–3) according to an index value that corresponds to a least significant address of a proffered address. Thus, for any proffered address, an associated tag may be found on anyone of the four tag arrays. If a tag matches a proffered address, then hit/miss logic 510 asserts a respective hit signal hit-way (2–5) 514. In this embodiment, a resource ID (R-ID) field 520 and a task ID (task-ID) field 522 is also included with each entry in the tag array, along with a set of valid bits VI (1–4). Usage of these fields will be described in more detail later. Prefetch circuitry 516 receives signals 512–514 and forms a request to L3 memory when a miss occurs. For each hit, the requested data is provided via bus 541b to an output port of the cache via cache output buffer 540b. In certain embodiments, an L1 cache may have task_ID and R-ID fields, while in other L1 cache embodiments these fields may be omitted.

The RAM-set also includes valid bit arrays 504(0–1) The RAM-set can be configured as a cache extension or as a block of RAM. When configured as RAM, a loading mechanism is provided by a separate DMA engine to optimize data transfer required by multimedia applications. For each hit in the RAM-set portion of the cache, requested data is provided via bus 541a a second output port of the cache via cache output buffer 540a.

Cache control circuitry 530 includes control registers 531 which are used to configure the configurable cache. Fields in the control register include: RAM_fill_mode, Cache_enable, organization, and Full_RAM_base. The control circuitry is coupled to all of the operational blocks of the configurable cache and allows for dynamic reconfiguration of the configurable cache under control of software.

In the embodiment of FIG. 4, the RAM-set has two different sized data arrays, Data array 506(0) is 64 kbytes and Data array 506(1) is 32 kbytes; however, other embodiments may specify all RAM-sets with the same size to simplify the hardware logic and the software model.

Each RAM-set has an associated TAG register, referred to as Full Set Tag 508(0–1) containing the base address of the RAM-set and a global valid bit (VG) 509(0–1) in addition to an individual valid bit contained in valid bit arrays 504(0–1), referred to as VI, for each segment of each segmented line in the associated data array. Each segment has also a dirty bit referred to as DI, not shown on this figure but on a later one. In the present embodiment, RAM-set lines have the same size as the cache lines; however, in other embodiments a longer line size can also be used to reduce the number of VI bits. RAM-set base registers are coupled with a logical comparison 542(0–1) on a most significant address portion 544 for each access request.

An organization field in cache control register (RAMset-ctrl[n]) 531 for each RAM-set provides the capability to configure it as a cache extension (RAM-set) or as a plain RAM. When configured as a plain RAM, the valid bits are ignored. Table 1 explains other fields in this register.

TABLE 1

Cache Control Register

| | |
|---|---|
| Bit[0] | 0/1 RAM-set 0 operates as a cache or as a RAM |
| Bit[1] | 0/1 RAM-set 1 operates as a cache or as a RAM |
| DMA mode bit | When set, block operations operate in DMA mode |
| Fill Mode | Line by line fill, or complete block fill |

For L2 caches, there is another control word that indicates which CPU can configure the RAM-set behavior of each L2 RAM-set. This control word is memory mapped and accessible only to the MPU master. For example: Bit[0] : 0/1 CPU master/DSP master for RAM set 0. A status register (not shown) connected to cache control circuitry 530 provides cache information, including number of RAM-sets, sizes, Cache number of way, and line size.

When configured as a RAM, base address registers 508 (0–1) are programmed such that this memory does not overlap with other memories in the system. Note, the base address register and the full set tag register are the same. This memory space is mapped as non-cacheable at the outer level. RAM control logic (address decode) generates a hit equivalent signal, which prevents the outer cache from fetching the missing data/instruction to the external memory. VG bit 509(0–1) acts as an enable/disable. It is set when the base address register is written to and cleared when the RAM is invalidated or disabled.

If the register base address of the RAM is programmed in such a way that the associated memory area overlays with the external memory, coherency is not guaranteed by hardware of this embodiment.

When configured as a cache, hit/miss control circuitry 510 generates hit/miss signals called hit-hit 512 and hit-miss 513 for each RAM-set. A hit-hit is generated when a valid entry of the RAM-set matches the address provided by the core. An entry is valid when both VG and its VI are set. A hit-miss signal is generated when the base address of the RAM is valid (VG=1) and matches the most significant portion of an address provided by a processor but the selected entry in the RAM-set has its VI equal to zero.

The hit-miss or hit-hit signal has precedence over the hit way (2–5) signals 524 of the 4-way set-associative cache. This implies that any value loaded previously in the cache that should be in the RAM-set is never selected and will eventually be removed from the cache. However, data can create coherency problem in case of modified data (copy back). Therefore, it is recommended to write back ("clean") or even flush the range of address that will correspond to the RAM-set range of addresses. Other embodiments might not have such precedence defined and instead rely on cache invalidate operations to correctly prepare an address range that will be programmed to reside in a RAM-set, for example.

Figure 5:
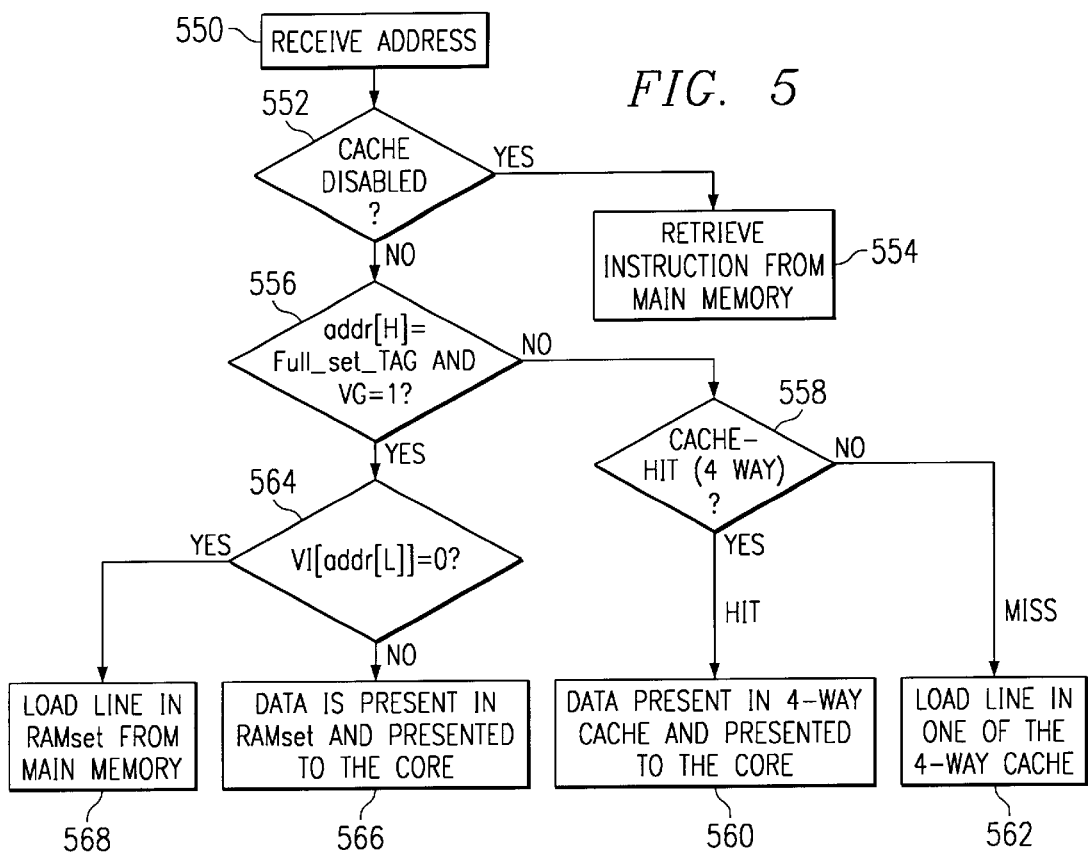
FIG. 5 is a flow chart illustrating operation of the hit/miss logic of the configurable cache of FIG. 4.

FIG. 5 is a flow chart illustrating operation of the hit/miss logic of the configurable cache of FIG. 4. In step 550, an address is received from the processor core in connection with a read operation. If the instruction/data cache is disabled, which is checked in step 552, the instruction/data is retrieved from second level memory in step 554. If the cache is enabled, then if either the high order bits of the address from the processor (ADDR[H]) do not match the high order bits of the starting address 508(n) or the global valid bit 509(n) is set to "0"(step 556), then there is a RAM-set miss. In this case, if there is a cache hit in the 4-way set associative cache in step 558, then the information is retrieved from the 4-way set associative cache is presented to the core processor via cache output buffer 540b. If there is a miss in the 4-way set associative cache, the line is loaded into the 4-way cache from second level memory.

Returning again to step 556, if both the high order bits of the address from the processor (ADDR[H]) match the high order bits of the starting address 508(n) and the global valid bit 509(n) is set to "1", then there is a RAM-set hit at the line corresponding to ADDR[L], and the valid entry bits are used to determine whether it is a hit-hit situation where the requested instruction is present in the RAM-set and can be presented to the processor, or a hit-miss situation where the requested instruction is mapped to the RAM-set, but the information needs to be loaded into the RAM-set's data array 506(n) from the second level memory. If, in step 564, the individual valid entry bit (VI) 504(n) for the line indicates that the line is valid (VI[ADDR[L]]=1), the instruction is present in the RAM-set and is presented to the processor through the RAM-set's output buffer 540a. If, on the other hand, the valid entry bit for the line indicates that the line is not valid (VI[ADDR[L]]=0), the line is loaded into the data array 506(n) of the RAM-set from main memory in step 568.

Figure 6:
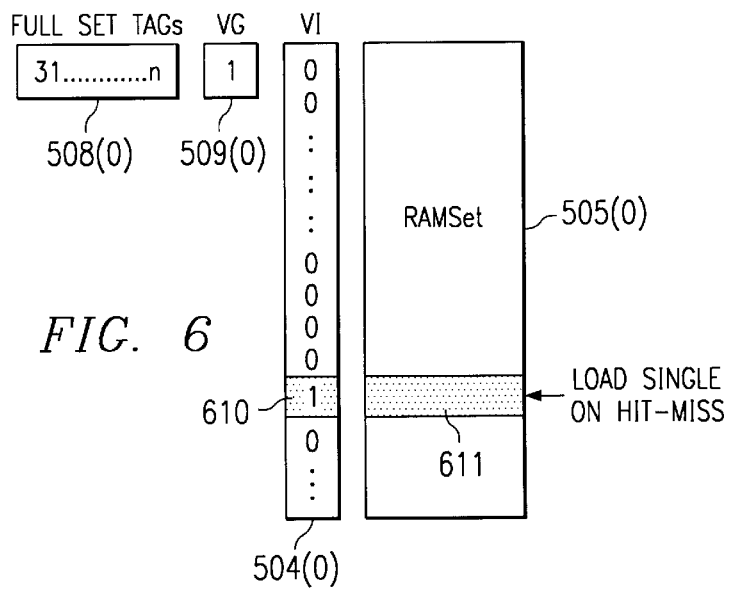
FIG. 6 is an illustration of loading a single line into the RAM-set of FIG. 4.

FIG. 6 is an illustration of loading a single line into the RAM-set of FIG. 4, in which only one data array 506(0) and its associated bases address register 508(0), global valid bit 509(0) and individual valid bit array 504(0) are illustrated. The RAM-set can be loaded in two ways: Line-by-line fill, and Complete fill/block fill, as indicated by the RAM_fill_ mode field of control register 531.

When a new value is written into full-set TAG register (base address) 508(0), all content of the RAM-set data array associated with that TAG register is invalidated by setting individual valid bits 504(0) to logical 0; however, global valid bit 509(0) is set to logical 1. Following the programming of the base address register, the RAM-set will begin to fill itself one line at a time on every hit-miss located in the RAM-set, as discussed with reference to FIG. 5. For example, after a miss at an address location corresponding to line 611, data is accessed from second level memory and placed in line 611, VI bit 610 is set to logical 1, and the requested data is provided to the processor.

On the other hand, if a set fill (RAM_fill_mode) is chosen, when the starting address is written to the Full_ set_tag register 508(0), all or a portion of the associated data array 506(0) is filled through a block fill process. As each line is loaded from second level memory, the individual valid entry bit 504(0) corresponding to the line is set to "1".

Figure 7:
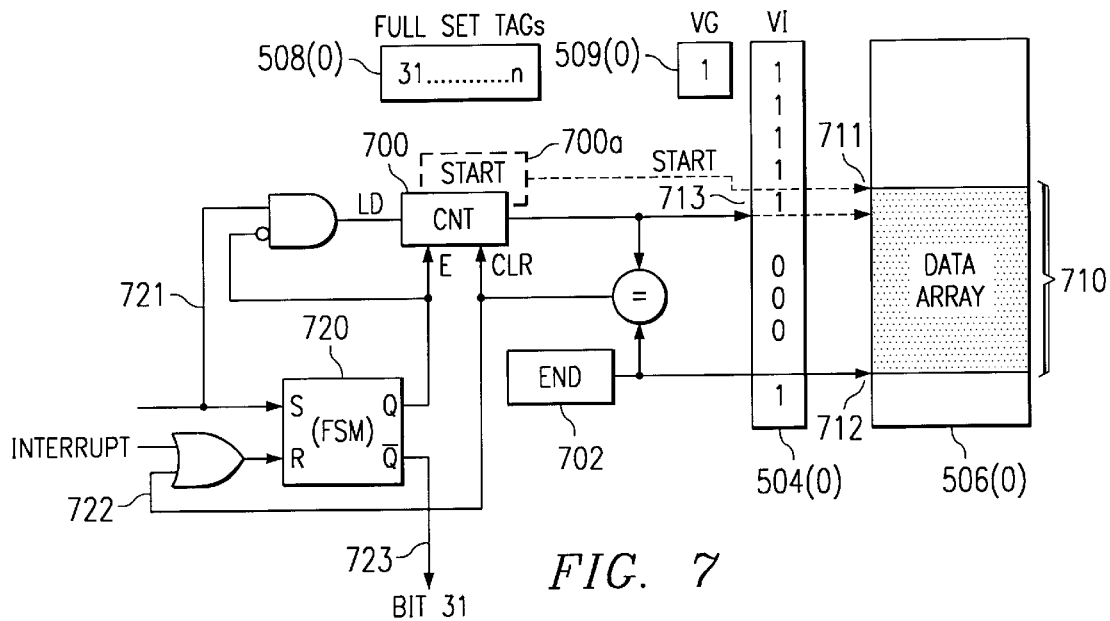
FIG. 7 is an illustration of loading a block of lines into the RAM-set of FIG. 4.

FIG. 7 is an illustration of loading a block of lines into the RAM-set of FIG. 4. The block fill is based on two additional registers called Start (CNT) 700 and End 702. Start is a 32-n-bit counter and End is a 32-n-bit register, where $2^n$ represent the number of byte per line. An array area 710 to be filled is defined by an initial value of Start 700a, indicated at 711, and the value of End 702, indicated at 712, for example. In this embodiment, a single block operation can span one or more RAM-set, for example. Writing a value in End register 702 sets the RAM-set control 530 in block fill mode for the block loading. Setting Start 700 after setting End 702 initiates a block transfer. At this time, all of the individual valid bits associated with array area 710 are set to logical 0. Setting Start address 700 without previously setting the end address or writing the same value in start and end simply loads the corresponding entry. A finite state machine (FSM) represented by flip-flop 720 controls the block fill. FSM 720 is part of control circuitry 530.

Asserting signal 721 causes load signal LD to be asserted to load Start register 700 and initiates the block fill. Signal LD is asserted in response to signal 721 if state machine 720 isn't already performing a block load from a prior command. Signal 721 is asserted in response to specific load operation command or a miss on load, which will be described later. As each line is loaded into array area 710, a corresponding individual valid bit is set to logical 1, such as bit 713, for example. Signal 722 is asserted when counter 700 has been incremented to equal the value in End 702. Signal 723 drives status bit 31 of a SmartCache status register to indicate when a block fill is in operation.

If state machine 720 is already performing a block load, a second one stops the current block load transfer. The system relies on the CPU to check that no active block load operation is on-going if the first prefetch must complete before another is initiated. Another embodiment could signal an error to the CPU or stall the CPU until completion of the current block load. However, the last embodiment is not suitable for real time system as the stall period becomes highly dependent on the block load size operation.

In the case of multiple RAM-sets, the start address determines in which RAM-set the block load is directed. The selection of the RAM-set is done by comparing the top part of the start address with the contents of the RAM-set base address and loading the bottom part in the counter (CNT). If the start address is not included inside any of the RAM-set, the instruction behaves like a prefetch block or respectively as a prefetch-line on the cache. Depending on the End and Start values, the block size can vary from one line to n lines.

As discussed earlier, the RAM-set of the Configurable cache can be managed in chunks of contiguous memory. Standard cache operations such as miss resulting from a CPU read access on the RAM-set prefetch I/D entry or clean entry are respectively changed into a block prefetch operation or a block cleaning operation if the end of block register 702 has been previously programmed. A block operation can also result from the programming end-of-block register 702 and start-of-block register 700. Clean operations are blocking, but interruptible on the completion of a line in order to guarantee maximum latency for real-time systems. An interrupt stops the block operation to let the CPU process the interrupt and the software then re-starts the block operation when the interrupt return occurs.

The block prefetch operation of the present embodiment re-use the existing hardware used for full cleaning of the cache; however another embodiment can have a different counter and state machine controller, for example. During the block operation the CPU can be in wait and its activity is resumed on reception of an interruption which stops the current block operation or the CPU can be concurrently running with a single cycle stall during line transfer in the write/read buffer.

Figure 8:
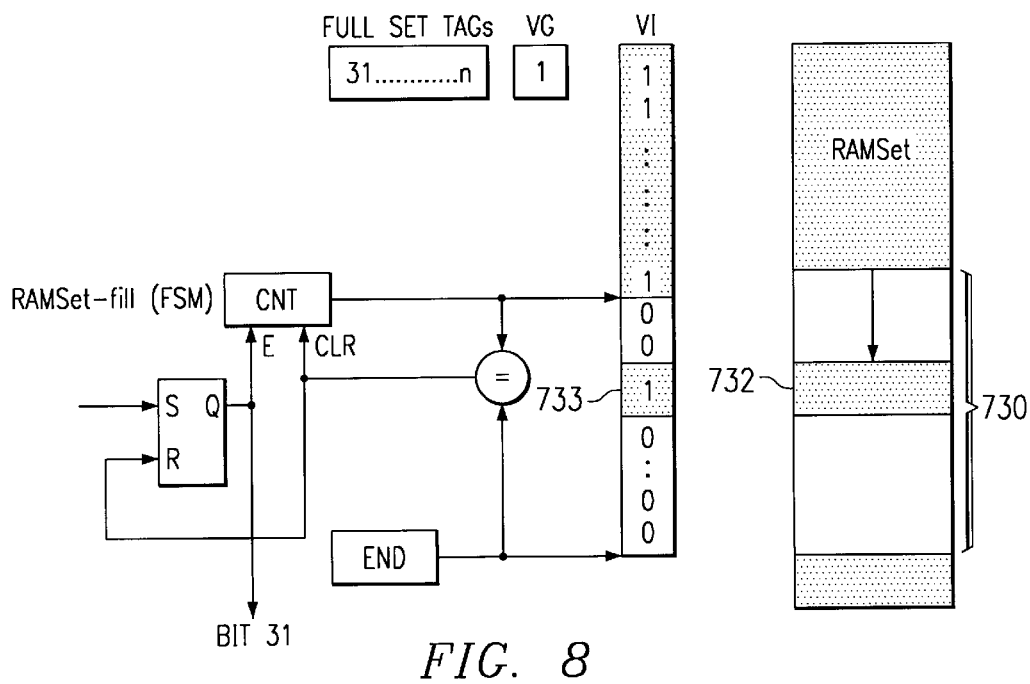
FIG. 8 is an illustration of interrupting a block load of the RAM-set according to FIG. 7 in order to load a single line within the block.

FIG. 8 is an illustration of interrupting a block load of the RAM-set according to FIG. 7 in order to load a single line within the block. To reduce system latency, a megacell processor, referred to generically as a CPU, advantageously can still access both cache and RAM-set when block loading is in progress; therefore, the following can happen:

(1) The CPU accesses a line already loaded. The CPU is served immediately or after one cycle stall if there is a conflict with a line load.

(2) The CPU accesses a line not yet loaded, referred to as a hit-miss. The CPU is served after the completion of the on-going line load. For example, if an access is made to line 732 prior to being loaded by a pending block load, then VI bit 733 will be logical 0. This will cause the hit-miss signal associated with this RAM-set to be asserted. Line 732 will then be accessed and loaded into data array 730 and the CPU request is satisfied.

In order to take further advantage of the fact that a line within data array 730 has been fetched in response to a CPU access request, each line load is done in two indivisible steps. First, the entry's VI bit is checked by detection circuitry 510 in response to control circuitry 530 to determine if the entry has already been fetched. Then, only if the line is not already present in the cache or in the RAM-set, it is loaded from secondary memory.

Before initiating a block load by programming new values in End and Start, the status must be checked to see that no previous block load is on-going. In this embodiment, there is no automatic hardware CPU stall on this case and doing so would cause the on-going block load to stop. This could result in an unexpected long latency in a real-time applications for accesses into the RAM-set in which the block load was interrupted in this manner. However, in another embodiment, means are provided to allow a second prefetch block command to stop a current active one. Once the second block command is completed, the first one is resumed.

Thus, the present embodiment provides an interruptible prefetch/save block on RAM-set using current cache mechanism: miss on load and prefetch D-line/prefetch I-line respectively for data/instruction after programming the end-of-block register, the CPU being in wait during block operation. Similarly, the present embodiment provides an interruptible clean block operation on RAM set using current cache mechanism clean-entry after programming the end-of-block register, the CPU being in wait during block operation. For prefetch block, the preferred embodiment is a non blocking operation on the current embodiment.

The present embodiment provides the ability to prefetch block on RAM-set using the cache mechanism: prefetch D-line/prefetch I-line respectively for data/instruction after programming the end-of-block register with concurrent CPU cache and/or RAM-set access.

The present embodiment performs both of the above using an end-of block register and a start-of block register to initiate block operation (initial value of the block counter).

The present embodiment also extends the Interruptible Prefetch/save block scheme to the cache with no boundary limit between cache and RAM-set. This is the same as cache operation based on range of addresses.

Cache Features

The unified cache memory of the present embodiment supports write back, and write through with/without write-allocate on a page basis. These controls are part of the MMU attributes. Hit under miss is supported to reduce conflicts between requesters and consequent latency. Concurrent accesses on RAM-sets and cache are supported.

Referring again to FIG. 4, on a cache miss, the segment corresponding to the miss is fetched from external memory first. For this discussion, data array 506(0) will be discussed, although it is actually configured as a RAM-set instead of Cache. All of the data arrays 506(0–5) have the same organization. Each data array has a number of lines, line 507 being representative, which are segmented into four segments 507(0–3) that each hold 16 bytes data or instruction. For example, in L1 cache 224 if a miss occurs in second segment 507(1), the second segment is fetched from second level RAM 113 or cache 114 or from third level memory 132, 134 if the second level misses. Then, the third segment and finally the fourth segment are loaded into segments 507(2) and 507(3) automatically, referred to as automatic hardware prefetch. In this embodiment, first segment 507(0) is not loaded into the cache. This sequence of loads can be interrupted on a segment boundary by a miss caused by a request having higher priority. The interrupted load is not resumed, as the remaining segments will be loaded if required later in response to a new miss.

Likewise, second level cache 114 has a data array with a number of lines that are segmented into four segments that each hold 16 bytes. If second level cache 114 misses, it will be filled from third level memory 132, 134 using a multi-cycle operation in which each segment of a given line is accessed. Multi-cycle operations on second level cache 114 are non-blocking. A Multi-cycle cache operation is launched and a status bit indicates its completion. As operations can be initiated by several requesters, such as DSP 104 and MPU 102, these operations can not be blocking due to real time constraints. If one processor initiates a clean_all_task_ID or a block operation for example, other requests can interleave.

Each cache segment has a valid bit (VI) and a dirty bit (not shown) in tag array 502(0–3). Each line such as 507 also has an associated shared bit (not shown) in the tag array. On a write back when a line is replaced, only the segments with modified (dirty) data are written back. Each RAM-set segment has a valid bit (VI) in tag array 504(0–1).

In this embodiment, RAM-sets do not have Task_ID and R-ID fields and shared bit markers associated with each line. Operations on task_ID, R-ID, data marked as shared are limited to the cache. However, another embodiment may harmonize the RAM-set and cache. The hit logic of second level cache 114 only uses the address field. Task-Id and R-Id are used in task operations only.

In this embodiment, L1 caches 202, 206, 222, 226 and L2 cache 114 are organized as 4-way set associative caches. A random cache replacement strategy has been chosen for the replacement algorithm of the 4-way set associative caches. In this embodiment, the caches do not support cache entry locking except through the RAM-set.

Table 2 includes a listing of the various cache and RAM control operations that can be invoked by the processors in the megacell of the present embodiment. In this embodiment, all operations on an entry operate on segments; there are four segments per entry in the L2 cache, as discussed above. When applied to L1 caches which are segregated into a data cache and a separate instruction cache, then the flush, clean and prefetch operations are directed to the type of information contained in the targeted cache. This means that a way is provided to identify on which cache, instruction or data, a command such as flush applies.

A state machine in cache controller circuitry 530 executes a requested control operation, as indicated by a control word.

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

TABLE 2

Cache and RAM Control Operations
(C: operation on the cache, RS: operation on RAM-set, R: operation on RAM)

| Function | | Software view (memory mapped/co-proc) |
|---|---|---|
| Flush_entry (address) | C/RS | Flush the entry[1], whose address matches the provided address or a Range of addresses, if End has been set previously. Flush-range instruction is made of two consecutive instructions Set_End_addr(address) + Flush_entry (address). |
| Flush_all_entry_of_task_ID(task_ID) | C | Flush all entries matching to the current taskID in the cache but not in the RAM_set |
| Flush_all_entry_of_R_ID (task_ID) | C | Flush all entries matching to the current R_ID in the cache but not in the RAM_set |
| Flush_all | C | Flush all entries in the cache but not in RAM-set |
| Flush_all_shared | C | Flush all entries marked as shared |
| Flush_all_task_ID_shared(task_ID) | C | Flush all entries matching the current taskID and marked as shared |
| Flush_all_task_ID_not_shared (task_ID) | C | Flush all entries matching the current taskID and marked as not shared |
| Clean_entry (address) | C/RS | Clean the entry[1], whose address matches the provided address or a Range of address if End has been set previously. Clean-range instruction is made of two consecutive instructions SET_End_addr(address) + Clean_entry (address). |
| Clean_all_entry_of_taskID(task_ID) | C | Clean all entries matching to the current taskID in the cache but not in the RAM-set |
| Clean_all_entry_Of_R_ID(task_ID) | C | Clean all entries matching to the current R_ID in the cache but not in the RAM-set |
| Clean_all | C | Clean all entries in the cache but not in RAM-set |
| Clean_all_shared | C | Clean entries marked as shared |
| Flush_all_task_ID_shared(task_ID) | C | Flush all entries matching the current taskID and marked as shared |
| Clean_all_taskID_not_shared(Task_ID) | C | Clean all entries matching the current taskID and marked as not shared |
| Clean&Flush_single_entry(address) | C/RS | Clean and flush the entry[1], whose address matches the provided address or a Range of address if End has been set previously. Clean-range instruction is |

TABLE 2-continued

Cache and RAM Control Operations
(C: operation on the cache, RS: operation on RAM-set, R: operation on RAM)

| Function | | Software view (memory mapped/co-proc) |
|---|---|---|
| | | made of two consecutive instructions Set_End_addr(address) + Clean_entry (address). |
| Clean&flush_all_entry_of_taskID (Task_ID) | C | Clean and flush all entries matching to the current taskID in the cache but not in the RAM-set |
| Clean&flush_all_entry_of_R_ID (Task_ID) | C | Clean and flush all entries matching to the current R_ID in the cache but not in the RAM-set |
| Clean&flush_all | C | Clean and flush all entries in the cache but not in RAM-set |
| Clean&flush_all_shared | C | Clean and flush entries marked as shared |
| Clean&flush_all_taskID_shared (task_ID) | C | Clean and flush all entries matching the current taskID and marked as shared |
| Clean&flush_all_taskID_not_shared (task_ID) | C | Clean and flush all entries matching the current taskID and marked as not shared |
| Set_RAM_Set_Base_addr(RAM-setID) | RS/R | Set new RAM-set base address, set VG and clear all VI and set End to last RAM-set address by default preparing the full RAM-set loading. In that case no need to write the END address before writing the start address to load the RAM-set |
| Set_End_Addr (address) | C/RS | Set end address of the next block load and set the RAM-set controller in block fill mode |
| Set_start_addr (address) | C/RS | Set start address of a block and initiates the loading of this block |
| Prefetch-entry(address | C/RS | Prefetch-the entry, whose address matches the provided address or a Range of address if End has been set previously. Prefetch-range instruction is made of two consecutive instructions Set_End_addr(address) + Prefetch_entry (address) |
| Flush_RAM-set (RAMset_ID) | RS/R | Clear VG and all VI of the selected RAM-set |

Detailed Aspects

Various aspects of the digital system of FIG. 1 will now be described in more detail.

Figure 9:
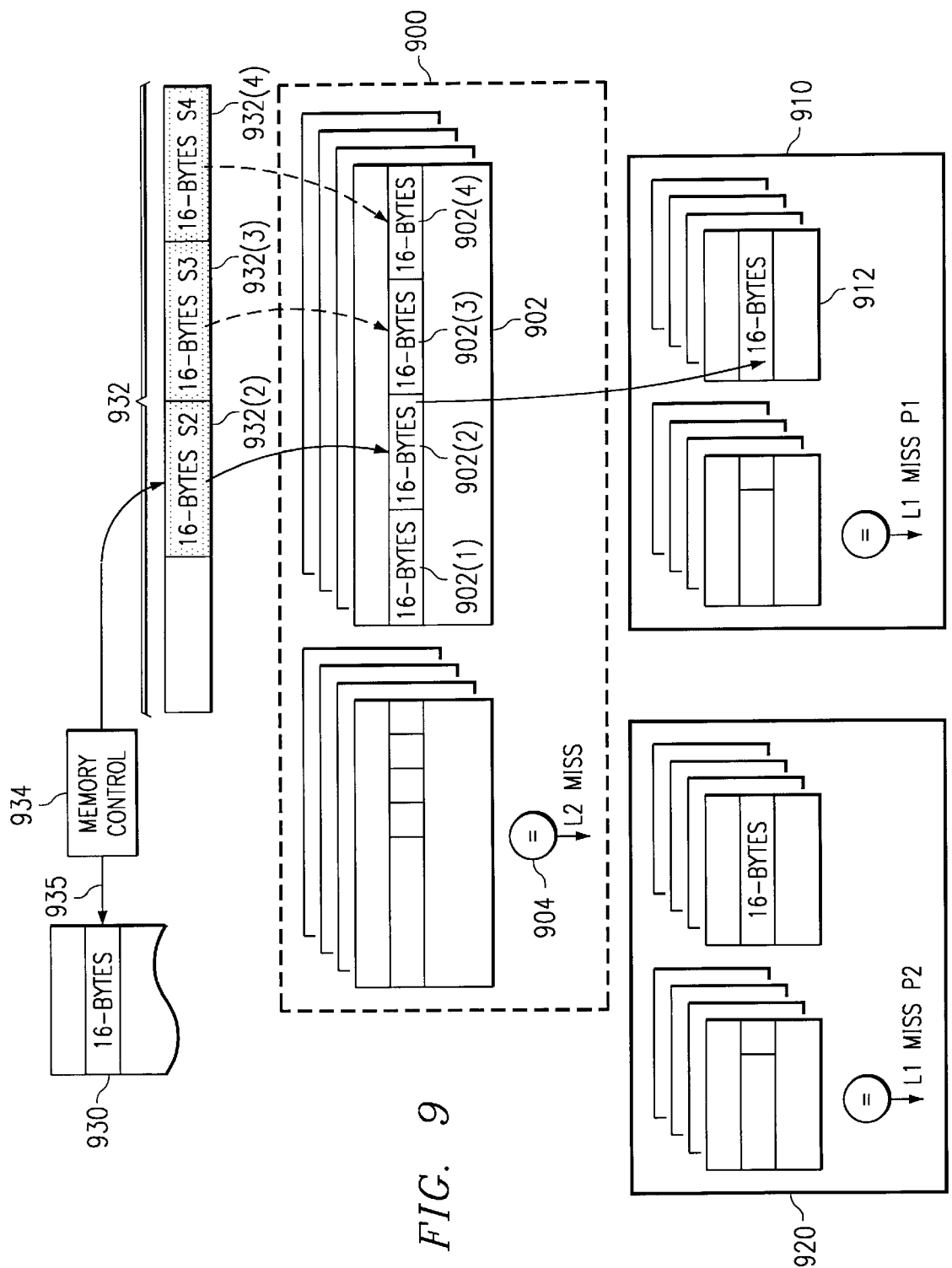
FIG. 9 is a flow diagram for the level two (L2) cache in the megacell of FIG. 1 illustrating an interruptible prefetch system that provides miss under miss support.

FIG. 9 is a flow diagram of an L2 cache 900 representative of L2 cache 114 in the megacell of FIG. 1, illustrating an interruptible prefetch system that provides miss under miss support. As described above, the L2 cache architecture of this embodiment is embodied with 4-way associatively, four segments per entry and four valid and dirty bits per entry. Backup memory 930 is representative of any L3 memory 132/134. When the L2-cache misses, the penalty to access data within L3 memory 132, 134 is high. The system supports miss under miss to let a second miss interrupt the segment prefetch for a first miss.

For example, when a processor P1 910 access to its L1 cache 912 misses and L2 cache 900 also misses, an L2-cache controller accesses backup memory 930 and transfers one or several segments 932 of 16 Bytes from memory 930 to a cache line 902, for example, in L2 cache 900. Memory controller 934 generates an address header 935 to access memory 930 in burst mode and one or several segments 932(n) of 16 Bytes can be transferred for the same request. If, for example, an access to a segment 902(2) misses as indicated by miss circuitry 904, then the controller associated with miss circuitry 904 fetches segment 932(2) and prefetches segment 932(3) and segment 932(4). Segment 932(2) is simultaneously forwarded to processor P1 to satisfy its request. During the miss time, other request that hit the L2 cache can be served. Subsequently, if an access from a processor P2 920 misses the L2 cache, then the ongoing prefetch sequence for processor P1 is stopped and the P2 miss is served. Therefore, some of the segments in line 902 will be valid, such as 902(2–3) for example, and some of them will still be invalid, such as 902(1, 4) for example if a prefetch sequence is interrupted.

In this embodiment of the invention, a later access to line 902 will result in a miss if segment 902(1) is accessed. However, since segment 902(2–3) are valid, they will not be prefetched, only segment 902(4) will be prefetched.

Thus, an interruptible L2-cache prefetch system with miss under miss support is provided.

Figure 10:
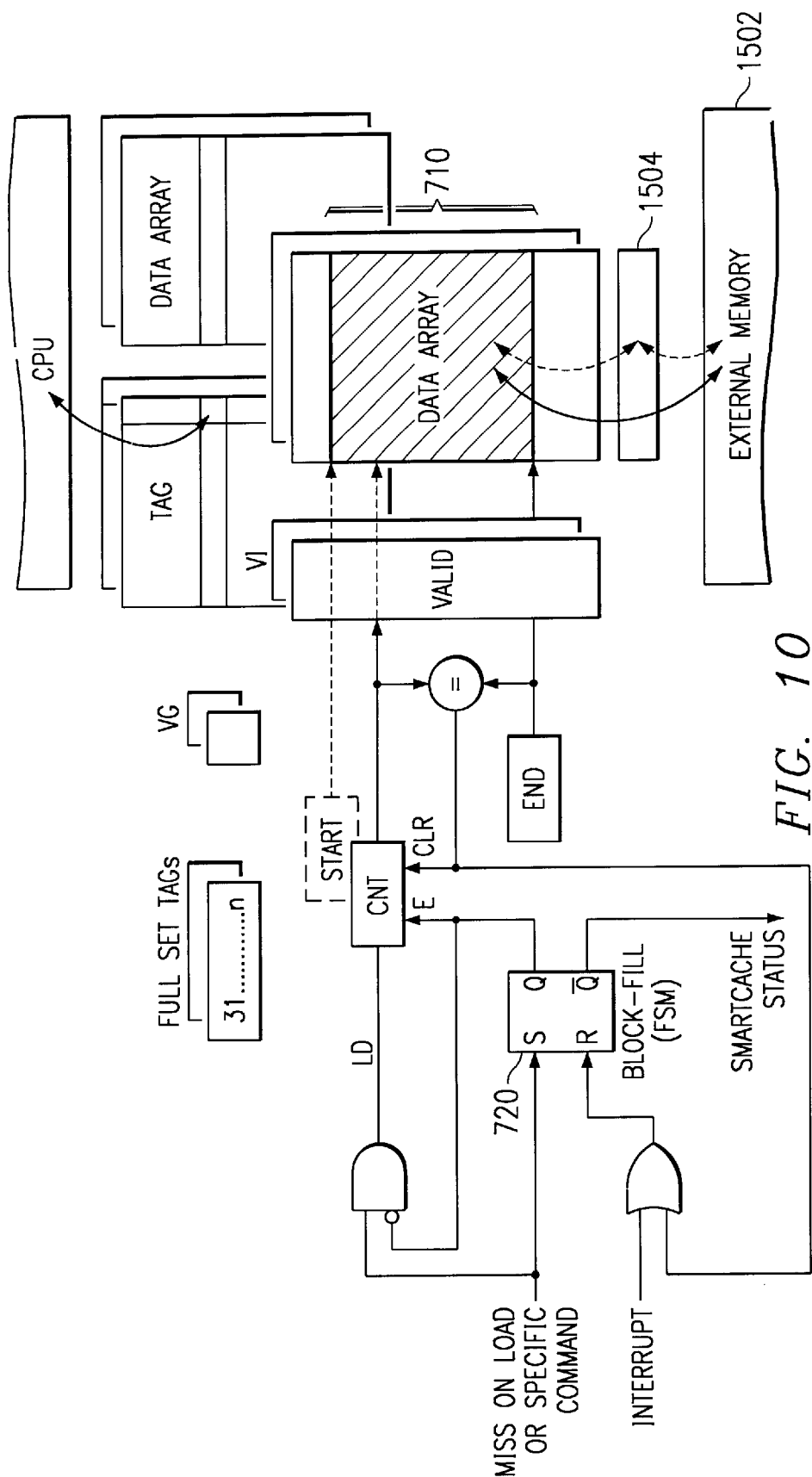
FIG. 10 is a block diagram of the cache of FIG. 7 illustrating data flow for interruptible block prefetch and clean functions in the RAM-set portion.

FIG. 10 is a block diagram of the level two (L2) cache of FIG. 7 illustrating data flow for interruptible block prefetch and clean functions; however the following discussion also applies to the L1 caches of FIG. 1. During a clean operation, a dirty line is first held in write buffer 1504 pending transfer to external memory 1502. Memory 1502 is representative of external memory 132 or on chip external memory 134 (FIG. 1). During a block load operation, a data line is transferred from external memory 1502 to data array 710 under control of FSM 720, as described earlier.

Figure 11:
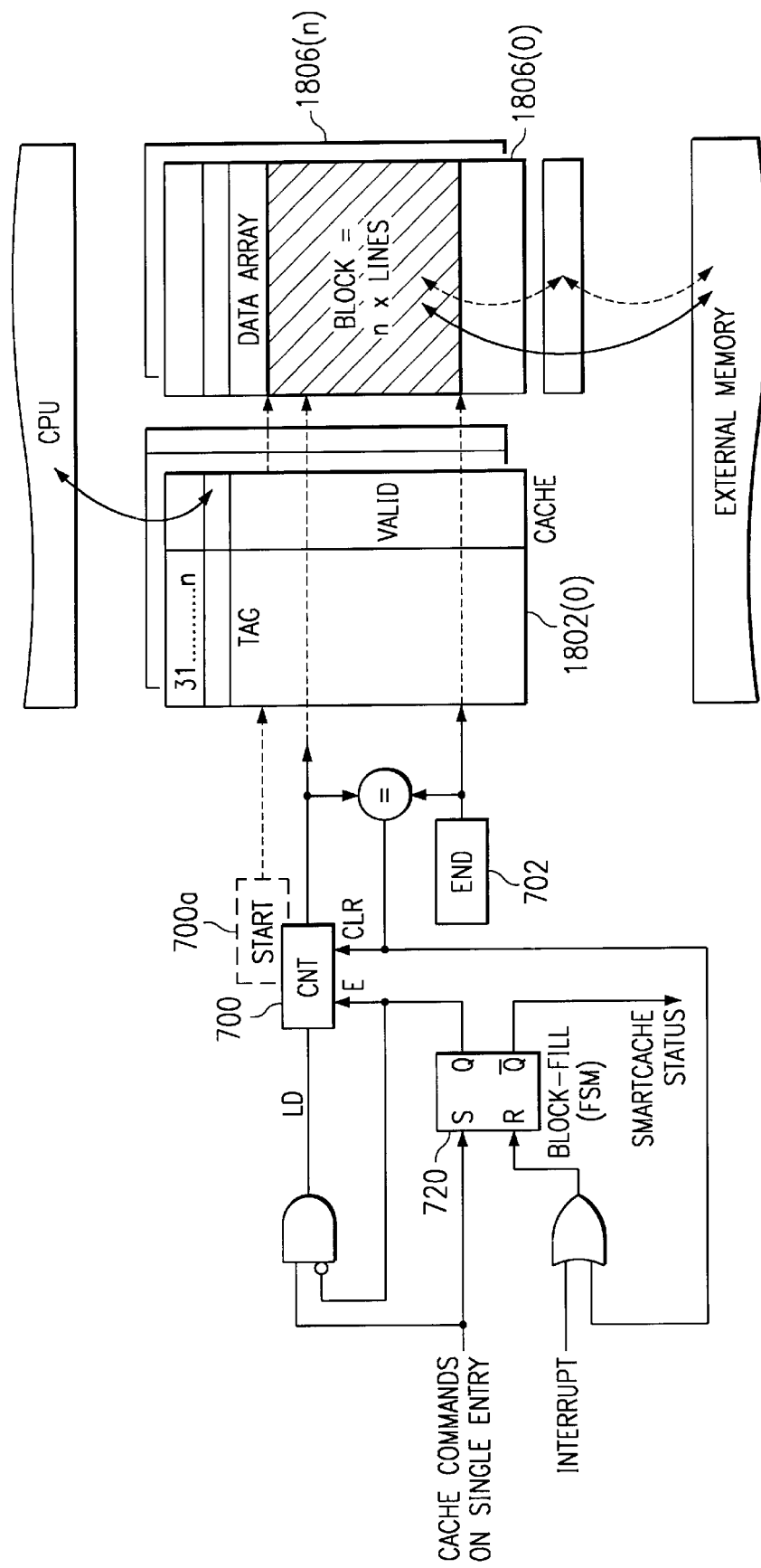
FIG. 11 illustrates operation of the cache of FIG. 4 in which a block of lines is cleaned or flushed in the set associative portion.

FIG. 11 illustrates operation of the cache of FIG. 4 in which a block of lines is cleaned or flushed. Programming register "end of block" 702 changes a cache operation such as clean or flush for a single specified entry to an operation on a block of lines located between this specified entry and the entry pointed by "end of block" register 702. The function can also be implemented using "end-of block" register 702 and start-of block register 700 to hold an initial value of the block counter. Finite state machine 720 controls the cache block flush and clean operations, as described previously with respect to FIG. 7 and FIG. 8 for cleaning and flushing the RAM-set. In the present embodiment, the same FSM and address registers are used to control cache cleaning and RAM-set cleaning operations.

Thus, a cache clean and/or a cache flush operation can be performed on a range of addresses in response to a software directive.

In another embodiment, separate control circuitry can be provided for the cache and for the RAM-set. Alternatively, in another embodiment a RAM-set may not be included.

Figure 12:
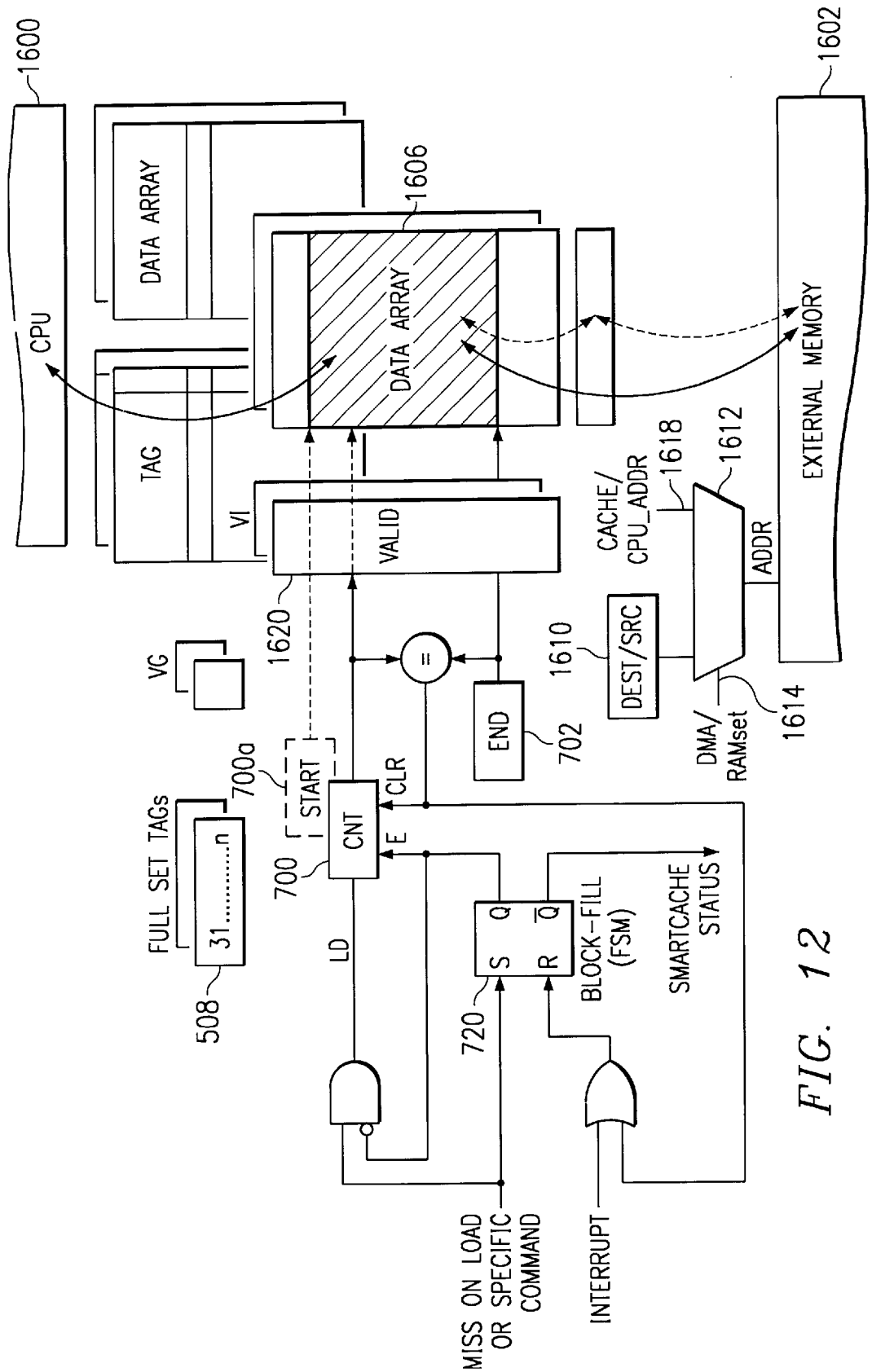
FIG. 12 is a block diagram of an alternative embodiment of the cache of FIG. 7 illustrating a source/destination register for DMA operation.

FIG. 12 is a block diagram of an alternative embodiment of the cache of FIG. 7 illustrating a source/destination register 1610 for direct memory access (DMA) operation. The RAM-set of the Configurable cache can be configured as a local memory with DMA support. DMA control circuitry is provided by cache hardware logic including FSM 720, start register 700 and end register 702. The Configurable cache commands are indifferently used in both modes. Multiplexor 1612 is controlled by mode signal 1614 to select dest/src register 1610 for providing addresses to external memory 1602 when in DMA mode. Source/destination register 1610 provides a destination/source address that enables re-allocation of data or instructions from an address space associated with data array 1606 to a different address space during transfer from/to external memory 1602. Likewise, multiplexor 1612 is controlled by mode signal 1614 to select cache address signals 1618 which are a concatenation of base-address register 508 and counter 700 for providing addresses to external memory 1602 when in RAM-set mode. In RAM-set mode, data array 1606 represents an address space for local storage of data or instructions from a same address space in external memory 1602. Mode signal 1614 is provided by a control register in control circuitry 530 (see FIG. 5) that is controlled by software. Software can change the mode from DMA operation to non-DMA operation as needed.

Existing valid bits 1620 of the RAM-set are used to monitor the DMA progress, as discussed with respect to FIG. 7 and 8. This allows CPU 1600 to have access to the RAM-set concurrently with the DMA operation, including within the range of addresses that are being transferred by the DMA operation.

Thus, identical control for local memory working as a cache (RAM-set) or as a local memory with DMA is provided. In an alternative embodiment, separate DMA control logic may be provided instead of reusing cache control FSM 720, for example.

Figure 13:
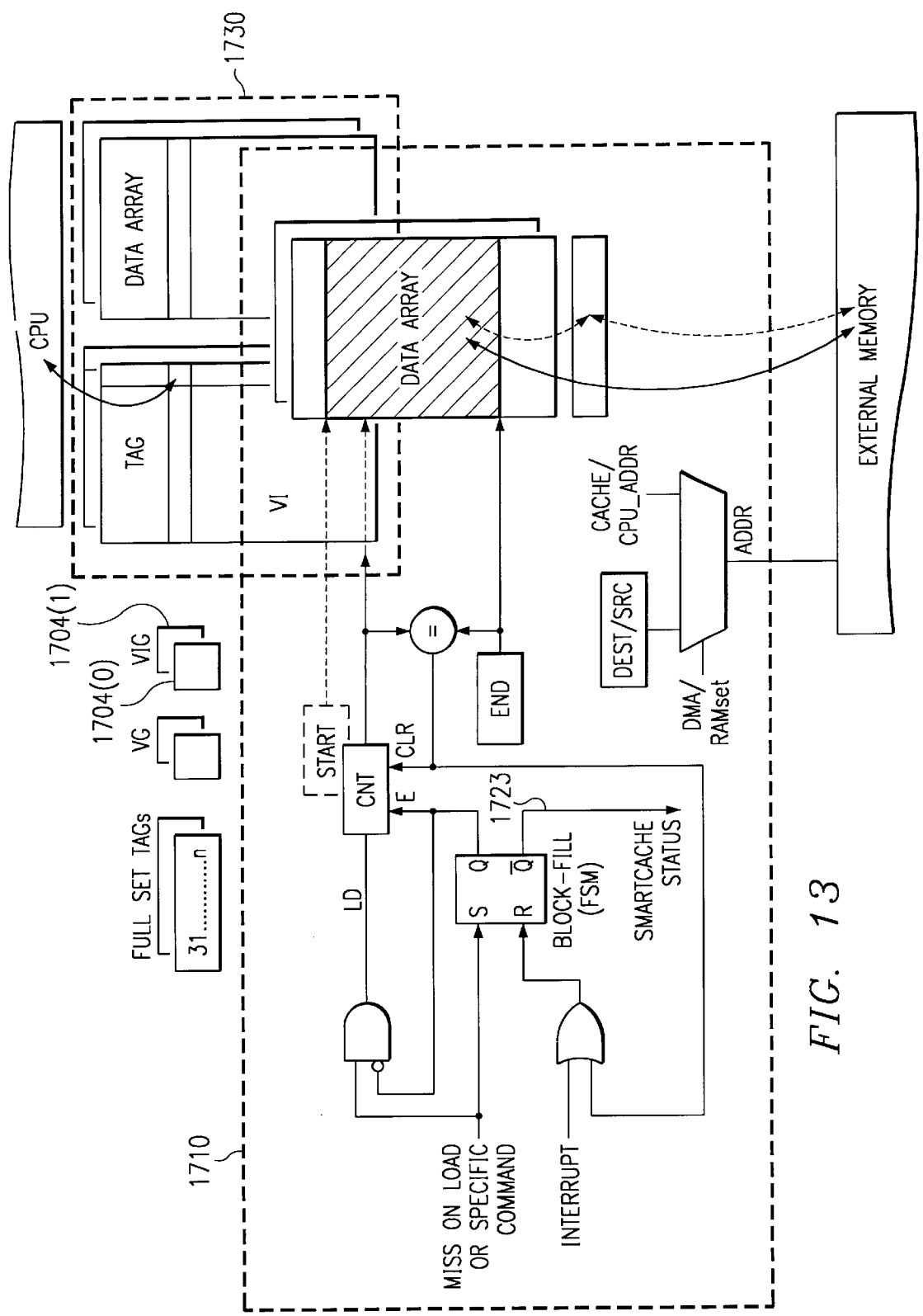
FIG. 13 illustrates an alternative embodiment of the cache of FIG. 12 using only a single global valid bit for DMA completion status.

FIG. 13 illustrates an alternative embodiment of the cache of FIG. 12 using only a status bit 1723 for DMA completion status. RAM-set 1710 of the Configurable cache is configured as a local memory with DMA support provided by the cache hardware logic, as described with respect to FIG. 12.

In this embodiment, a single global individual valid bit VIG 1704*n*) is provided for each RAM-set data array. In RAM-set mode, any access to the RAM-set when the VIG bit is off results in a miss. A resulting block prefetch will then assert the VIG bit after the entire block is loaded.

Progress of a DMA transfer is simply monitored by checking a status bit responsive to status signal 1723 to indicate completion of a DMA transfer. Status signal 1723 is connected to bit 31 of a SmartCache status register and is used to indicate when a block fill operation is in progress.

Thus, concurrent access on cache or on both cache 1730 and RAM-set 1710 are provided, except in the DMA range during DMA on RAM-set.

Figure 14:
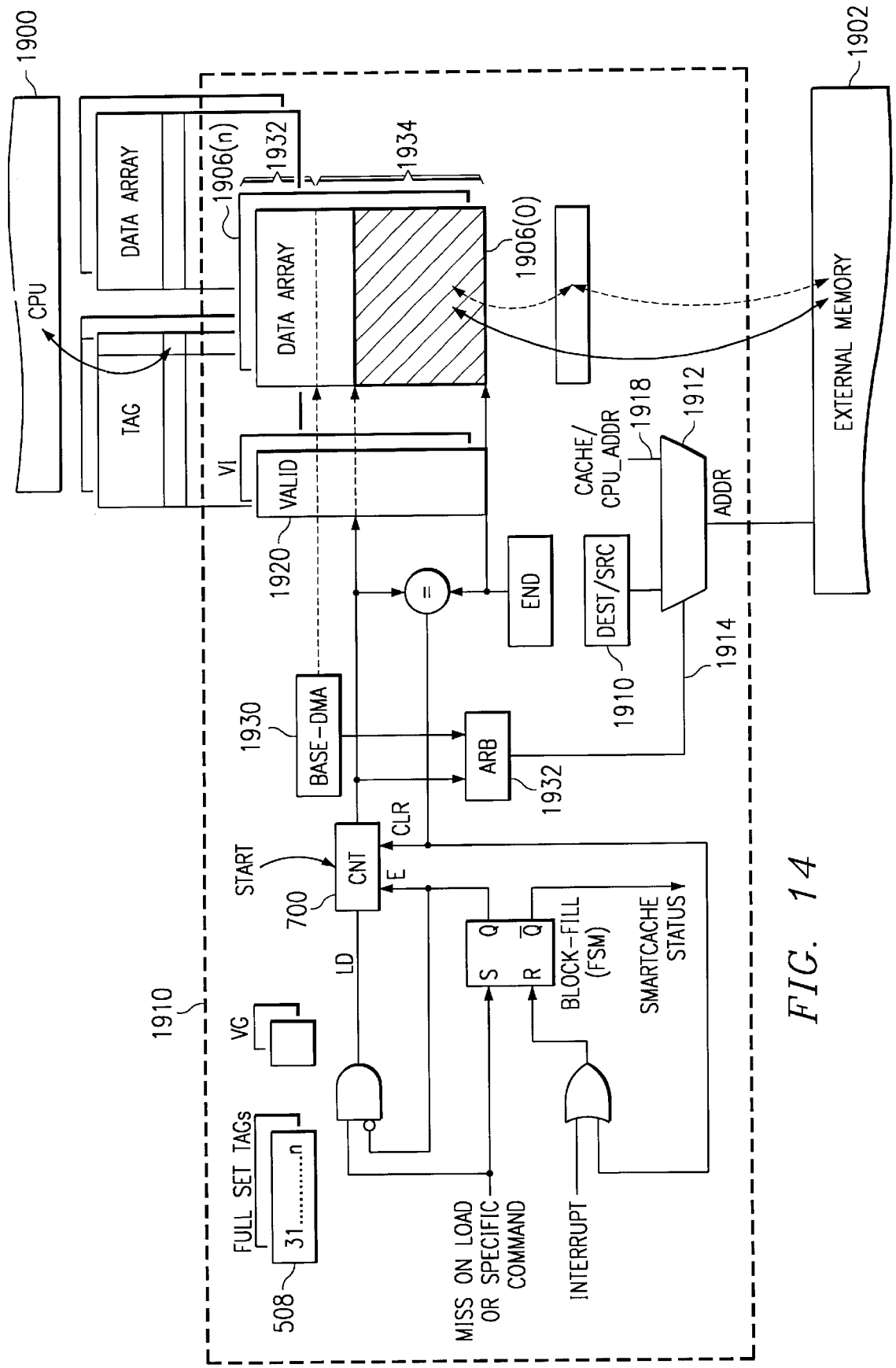
FIG. 14 illustrates an alternative embodiment of the cache of FIG. 12 having a DMA-base register and arbitration circuitry to support local memory with DMA operation simultaneously with RAM-set operation in the same RAM-set.

FIG. 14 illustrates an alternative embodiment of the cache of FIG. 12 having a DMA-base register 1930 and arbitration circuitry 1932 to support local memory with DMA operation simultaneously with RAM-set operation in the same RAM-set 1910. This allows a first portion 1932 of data array 1906(0) to operate as a RAM-set, as described earlier, and also allows a second portion 1934 to operate as a local memory with DMA type transfers. Base address register (base-DMA) 1930 indicates the beginning of the section of the RAM-set behaving as a local memory with DMA. As this is a working area, only one register is needed to split the RAM-set in two parts.

Multiplexor 1912 is controlled by mode signal 1914 to select dest/src register 1910 for providing addresses to external memory 1902 when signal 1914 is asserted. Mode signal 1914 is generated by arbitration circuitry 1932 in response to the current value of count register 700. Mode signal 1914 is asserted when count register 700 has a value that exceeds a value stored in base-DMA register 1930; otherwise signal 1914 is de-asserted.

Source/destination register 1910 provides a destination/source address that enables re-allocation of data or instructions from an address space associated with data array 1906 to a different address space during transfer from/to external memory 1902. Likewise, multiplexor 1912 is controlled by mode signal 1914 to select cache address signals 1918 which are a concatenation of base-address register 508 and counter 700 for providing addresses to external memory 1902 when signal 1914 is de-asserted. In RAM-set mode, data array 1906 represents an address space for local storage of data or instructions from a same address space in external memory 1902. Software can change the value stored in base-DMA register 1930 as needed.

Existing valid bits 1920 of the RAM-set are used to monitor the DMA progress, as discussed with respect to FIG. 7 and FIG. 8. This allows CPU 1900 to have access to the RAM-set concurrently with the DMA operation, including within a range of addresses that are being transferred by the DMA operation.

Figure 15:
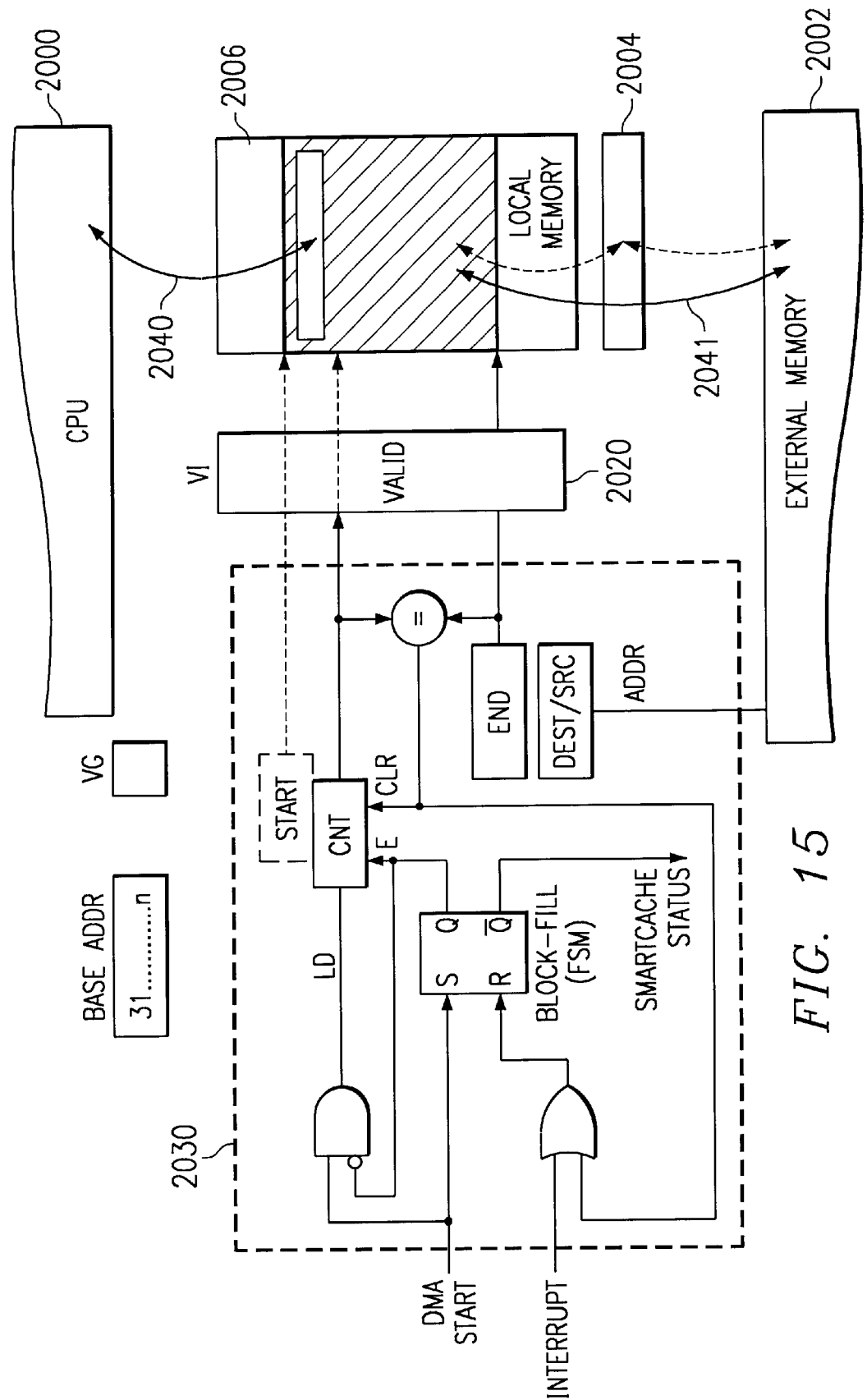
FIG. 15 illustrates an embodiment of a local memory that uses of a set of valid bits to support concurrent DMA and CPU access.

FIG. 15 illustrates an embodiment of a local memory 2006 that uses of a set of valid bits 2020 to support concurrent CPU and DMA access, indicated at 2040. The local memory is segmented in line with individual valid bits enabling a CPU 2000 to access any line outside or inside the DMA range concurrently while the DMA transfer is on going. If a CPU is accessing a line ahead of the DMA, the DMA is momentary stalled to load the line accessed by the CPU and the DMA is then resumed. This operation is similar to the operation of a RAM-set as described with reference to FIG. 7 and FIG. 8. Similar to the RAM-set operation described with respect to FIG. 8, prior to loading each line, DMA engine 2030 checks a valid bit associated with that line from the set of valid bits 2020 to avoid overwriting a valid line, which would have been loaded ahead of the DMA execution in response to a CPU access.

Figure 16:
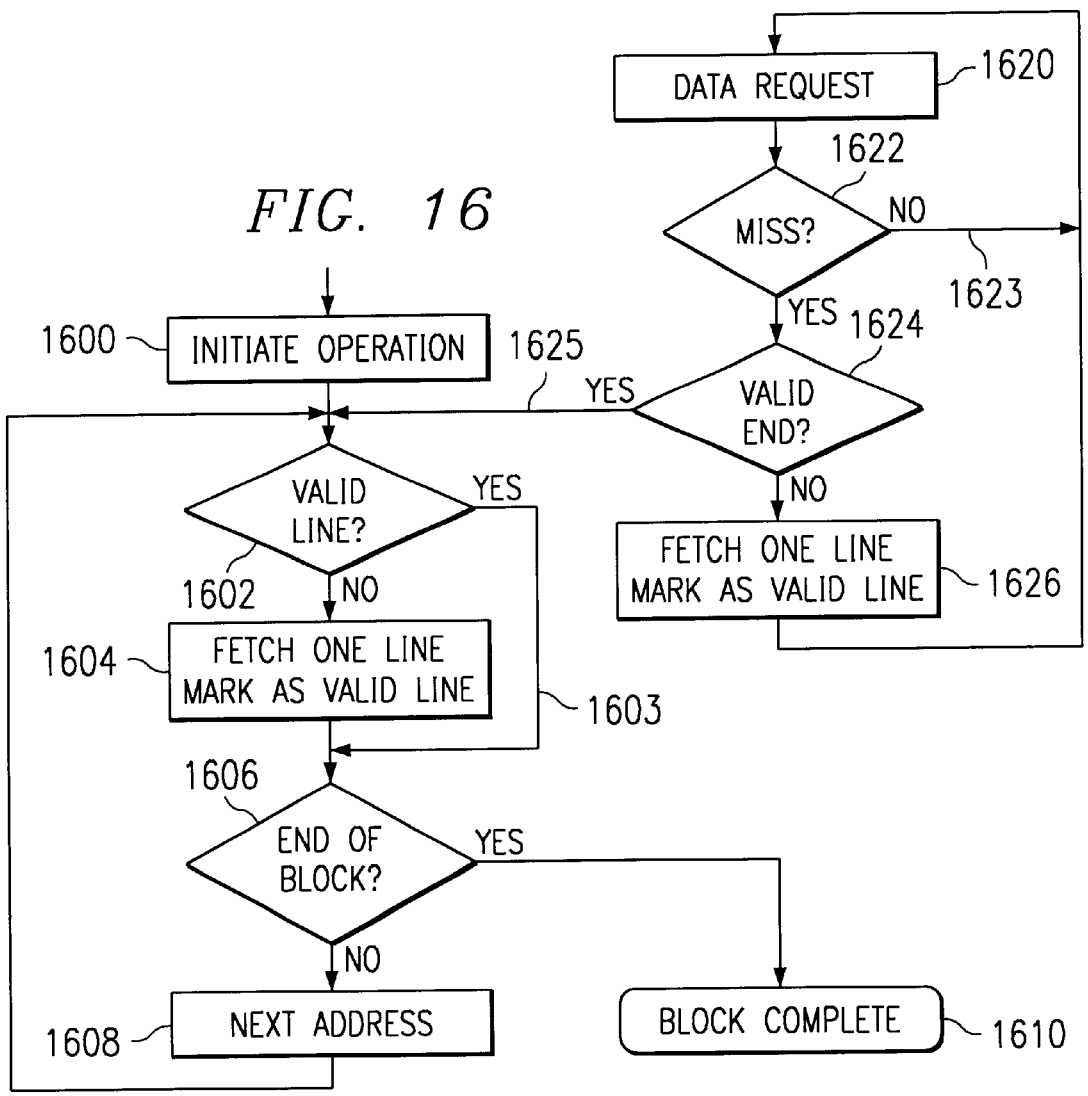
FIG. 16 is a flow diagram illustrating an interruptible block operation on the memory circuitry of FIG. 4, according to aspects of the present invention.

FIG. 16 is a flow diagram illustrating an interruptible block operation on the memory circuitry of FIG. 4, according to aspects of the present invention. As discussed earlier (see Table 2 —Cache and RAM Control Operations), a block operation can be performed to load or to clean a portion of the cache or RAM-set. This discussion will describe a block load, but a block clean operates in a similar manner. In step 1600, a block operation is initiated to load a selected portion of the segments in the cache or RAM-set, according to a value stored in end register 702 and in start register 700. The operation is initiated by writing an operation directive, as listed in Table 2, to control circuitry 530 along with a starting address that is loaded in start register 700. In this embodiment, all segments within the selected block of segments are automatically invalidated in response to initiating the block operation. However, in another embodiment, segments may or may not be automatically invalidated.

In step 1602, prior to loading a line, the valid bit (VI bit 504(0), see FIG. 7) associated with the line, or with the segment of the line if there are multiple segments per line, is tested to determine if the segment contains valid data. If the segment does not contain valid data, then a line or a segment is fetched in step 1604 and the segment is then marked as being valid by setting a corresponding valid bit. On the other hand, if step 1602 determines that a segment contains valid data from a prior data transfer operation, then step 1604 is inhibited and a transfer to the valid segment is not performed, as illustrated by link 1603. Advantageously, performance is improved by inhibiting transfers to segments that already have valid data.

In step 1606, a test of end register 702 is made to determine if the end of the block has been reached. If so, the block operation is completed at step 1610. If the end of the block has not been reached, then the next address is selected in step 1608 and steps 1602, 1604 and 1606 are repeated.

An aspect of the present invention is that a processor connected to the memory circuit can continue to execute instructions during a block operation. In so doing, it may access an address during step 1620 that is within a block that is being loaded as a block operation, as discussed with respect to FIG. 8.

In step 1622 miss circuitry checks a valid bit associated with the segment that is accessed by the processor in step 1620 to determine if the segment contains valid a instruction or data value. If the CPU accesses a line already loaded, the CPU is served immediately or after one cycle stall (conflict with a line load), as indicated by arc 1623.

If the CPU accesses a line not yet loaded (hit-miss), then the CPU is served after the completion of an on-going block line load. For example, if an access is made to line 732 prior to being loaded by a pending block load, then VI bit 733 will be logical 0. This will cause the hit-miss signal associated with this RAM-set to be asserted in step 1622. Line 732 will then be accessed and loaded into data array 730 in step 1626 and the CPU request is satisfied. During step 1626, the valid bit for the segment just fetched is asserted, so that a later access attempt by the block loading circuitry will be inhibited, as discussed in step 1602.

In step 1624, this embodiment of the invention performs a test after a miss is detected in step 1622. If end register 702 has been loaded with an end-of-block address and a block transfer is not currently underway, as indicated by status signal 723 from FSM 720, then a block operation is commenced, as indicated by arc 1625. In this case, the block operation starts at an address provided by the miss detection circuitry associated with the miss detected in step 1622. The block operation ends at the address provided by the end register.

Another embodiment of the present invention may not provide the feature illustrated by step 1624. Other combinations of the various features illustrated in FIG. 16 may be provided in other embodiments of the the invention. For example, another embodiment of the invention may provide block initiation by step 1624, but not provide an operation initiation step 1600. Another embodiment of the invention may provide block initiation as a DMA block, as illustrated in FIG. 15. In another embodiment of the invention, a block operation may be initiated by a cache prefetch, as illustrated in FIG. 9.

Digital System Embodiment

Figure 17:
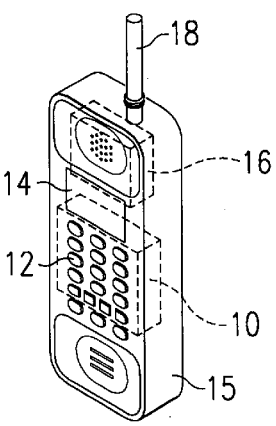
FIG. 17 is a representation of a telecommunications device incorporating an embodiment of the present invention.

FIG. 17 illustrates an exemplary implementation of an example of such an integrated circuit in a mobile telecommunications device, such as a mobile telephone with integrated keyboard 12 and display 14. As shown in FIG. 17, the digital system 10 with a megacell according to FIG. 2 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

It is contemplated, of course, that many other types of communications systems and computer systems may also benefit from the present invention, particularly those relying on battery power. Examples of such other computer systems include personal digital assistants (PDAs) portable computers, smart phones, web phones, and the like. As power dissipation is also of concern in desktop and line-powered computer systems and micro-controller application, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, the L2 cache may be a simple cache that does not include RAM-set or configurable features while still providing interruptible block transfers. The cache may be positioned at a level other than L2. The cache may have a different set organization with a different number of segments per line, for example.

It is therefore contemplated that the appended claims will cover any such modifications of the embodiments as fall within the true scope and spirit of the invention.

What is Claimed is:

1. A digital system comprising:
   at least first processor;
   a first memory circuit having a plurality of segments, the first memory circuit operable to respond to data requests from the processor;
   validity circuitry connected to the first memory circuit, the validity circuitry operable to indicate if each segment of the plurality of segments holds a valid data;
   block transfer circuitry connected to the first memory circuit, the block transfer circuitry operable to transfer a block of data to a selected portion of segments of the plurality of segments in such a manner that a transfer to a first segment holding valid data within the selected portion of segments is inhibited.

2. The digital system of claim 1, wherein the first memory is a cache having miss detection circuitry, and wherein the block transfer is a prefetch of a block of data to the selected portion of segments in response to a miss detected by the miss detection circuitry.

3. The digital system of claim 1, wherein the first memory circuit is a RAM-set in which the plurality of segments represent a contiguous sequence of addresses.

4. The digital system of claim 1, wherein the block transfer circuitry comprises a start register for holding a beginning address of a block of data and an end register for holding an end address of a block of data, wherein the start register and end register are connected to receive address values from the first processor.

5. The digital system of claim 4, wherein the block transfer circuitry is operable to transfer a block of data to the first memory using an address provided by the miss circuitry as a starting address of the block of data.

6. The digital system of claim 5, wherein the miss circuitry provides an address to the block circuitry in response to a prefetch operation.

7. The digital system of claim 1, wherein the block circuitry is interruptible to allow data requests by the first processor to the selected portion of segments during the block transfer such that the first segment is provided with valid data after initiating a block transfer.

8. The digital system according to claim 1 being a cellular telephone, further comprising:

an integrated keyboard connected to the CPU via a keyboard adapter;

a display, connected to the CPU via a display adapter;

radio frequency (RF) circuitry connected to the CPU; and an aerial connected to the RF circuitry.

9. A method of operating a digital system having a processor and memory circuit, comprising the steps of:

initiating a block transfer to a selected plurality of segments in the memory circuit;

detecting if a first segment within the selected plurality of segments holds valid data; and inhibiting a transfer within the block transfer to the first segment if the first segment contains a valid data value.

10. The method of claim 9, further comprising the step of transferring the valid data value to the first segment after the step of initiating the block transfer.

* * * * *